(12) United States Patent
Angermeier et al.

(10) Patent No.: US 9,252,647 B2
(45) Date of Patent: Feb. 2, 2016

(54) TECHNIQUE FOR ELECTRICALLY CONNECTING A GENERATOR AND AN EXCITER

(71) Applicant: Siemens Aktiengesellschaft, München (DE)

(72) Inventors: Geary W. Angermeier, Fort Mill, SC (US); Amit Bhardwaj, New Dehli (IN); Joshua R. Brown, Concord, NC (US); Roopa Rani Gangisetty, Gurgaon (IN); Robert E. Jobe, Charlotte, NC (US); Alan A. Marfin, Charlotte, NC (US); Jatin Mehra, Amritsar (IN); Terrell H. Yon, III, Orlando, FL (US)

(73) Assignee: SIEMENS AKTIENGESELLSCHAFT (DE)

( * ) Notice: Subject to any disclaimer, the term of this patent is extended or adjusted under 35 U.S.C. 154(b) by 40 days.

(21) Appl. No.: 14/258,947

(22) Filed: Apr. 22, 2014

(65) Prior Publication Data

US 2014/0319943 A1    Oct. 30, 2014

(30) Foreign Application Priority Data

Apr. 30, 2013  (EP) .................................. 13166008

(51) Int. Cl.
*H02K 11/00* (2006.01)
*H02K 19/38* (2006.01)
*H01R 13/04* (2006.01)
*H01R 13/22* (2006.01)

(52) U.S. Cl.
CPC ................ *H02K 19/38* (2013.01); *H01R 13/04* (2013.01); *H01R 13/22* (2013.01)

(58) Field of Classification Search
CPC ......... H02K 19/38; H01R 13/04; H01R 13/22
USPC .......................... 310/71, 68 D; 439/438, 638
See application file for complete search history.

(56) References Cited

U.S. PATENT DOCUMENTS

| | | | |
|---|---|---|---|
| 3,363,122 A | | 1/1968 | Hoover |
| 3,808,490 A | * | 4/1974 | Khutoretsky et al. ......... 310/165 |
| 4,014,599 A | * | 3/1977 | Bogdanov et al. ................ 439/9 |
| 4,091,299 A | * | 5/1978 | Vitchenko et al. .............. 310/71 |
| 4,472,649 A | * | 9/1984 | Namba et al. ............... 310/68 D |
| 4,806,814 A | | 2/1989 | Nold |
| 4,900,959 A | | 2/1990 | Drinkut |
| 5,136,195 A | | 8/1992 | Allen, III |
| 5,777,408 A | * | 7/1998 | Brem .............................. 310/71 |
| 2010/0066186 A1 | | 3/2010 | Brown |

* cited by examiner

*Primary Examiner* — Hanh Nguyen
(74) *Attorney, Agent, or Firm* — Ostrolenk Faber LLP

(57) ABSTRACT

A connection device includes a body having a first and a second end, a first connector set at the first end, and a pin type connector set at the second end. The first connector set includes a first strip element and a second strip element, which form an electrical interface of the connection device. The pin type connector set includes a first element and a second element, and thus forms another electrical interface of the connection device, different from the electrical interface formed by the first connector set. The pin type connector may be projecting pins or hollows that receive pins. The first connector set is electrically connected to the pin type connector set. Thus, the connection device is adapted for electrically connecting a generator with an exciter having incompatible electrical interfaces.

17 Claims, 4 Drawing Sheets

TECHNIQUE FOR ELECTRICALLY CONNECTING A GENERATOR AND AN EXCITER

CROSS-REFERENCE TO RELATED APPLICATIONS

The present application claims priority of European Patent Application No. EP 13166008, filed Apr. 30, 2013, the contents of which are incorporated by reference herein.

FIELD OF THE INVENTION

The present invention relates to a technique for electrically connecting a generator and an exciter, and more particularly through a connection device.

TECHNICAL BACKGROUND

Power generation plants produce electricity by converting an energy source (e.g. fossil fuel, nuclear fusion, hydraulic heat and geothermal heat) into mechanical energy (e.g. rotation of a turbine shaft), and subsequently converting the mechanical energy into electrical energy (e.g. by the principles of electromagnetic induction). Some power generation plants, such as a turbogenerator, comprise a turbine, a generator and an exciter. Typically, the turbine, the generator and the exciter are coupled to each other in axial alignment, with the generator located between the turbine and the exciter.

The output of the turbine is mechanical energy in the form of turbine shaft rotation which is then converted into electrical energy by the generator. The generator includes an axially extending rotor surrounded and sleeved by an annular stator of the generator. The rotor includes a shaft on which conductive coil windings are axially arranged and which is capable of rotating inside the stator. The turbine shaft rotates the generator rotor shaft, and the exciter through a shaft provides an electric current to the conductive coil windings of the shaft of the rotor. The rotating electrically charged rotor creates a magnetic flux that induces an electric current in stationary stator coil windings present in the stator. This induced electric current is then drawn from the stator and constitutes the electricity that the power generation plant provides.

One prerequisite of the above-described power generation scheme is the electrical interconnection of the exciter and the generator enabling the exciter to provide the electric current to the conductive coil windings in the rotor shaft. An electric current is transported in a closed loop configuration from an electrical interface of the shaft of the exciter to an electrical interface of the shaft of the generator. The electric current subsequently flows to the generator rotor coil windings, and then back to the exciter.

Typically, the electrical interfaces are located at axial leads of the shafts of the generator and the exciter and are either a 'butterfly type' or a 'pin type' electrical interface.

In the 'butterfly type' electrical interface there are at least two flattened strips, made of electrically conducting material, positioned on a surface at the axial lead of the generator or the exciter such that they can establish an electrical connection by physical contact with similarly structured and similarly oriented two counterpart conducting strips positioned on a surface at the axial lead of the exciter or the generator, respectively.

In 'pin type', there is a male part and a female part, each made of electrically conducting material. The male part includes at least two pins and the female part includes at least two receptacles, each receptacle suitable to receive one pin of the male part though an opening of the receptacle.

The electrical connection between the generator and the exciter is established by inserting the pins into the receptacles, and thereby physically and electrically connecting the pins and the receptacles.

In one variation of the pin type, the male part is positioned extending out from a surface at the axial lead of the generator and the female part is located at the exciter with the openings of the receptacles positioned on a surface at the axial lead of the exciter. In an alternate variation of the pin type, the male part is positioned extending out from the surface at the axial lead of the exciter and the female part is located at the generator with the openings of the receptacles positioned on the surface at the axial lead of the generator.

In yet another variation of the pin type electrical interface, the generator and the exciter both have female parts i.e. the receptacles are provided on the rotor shaft with openings of the receptacles on the surface at the axial lead of the generator. Similarly, the receptacles are also provided on the exciter shaft with openings of the receptacles on the surface at the axial lead of the exciter shaft. Subsequently, the male part having the pins is introduced as an additional component between the female part of the generator and the female part of the exciter, wherein for each pin, one portion of the pin is inserted into the openings of the receptacles of the rotor of the generator and another portion of the pin is inserted into the openings of the receptacles of the shaft of the exciter.

It may be noted that butterfly type connection does not conform to pin type connection and thus an electrical connection can only be established between a generator and an exciter if the electrical interfaces of the generator and the exciter are either both of the pin type or both of the butterfly type. A generator having the pin type interface is incompatible to be physically coupled to an exciter having the butterfly type interface for establishing an electrical connection. Similarly, a generator having the butterfly type interface is incompatible to be physically coupled to an exciter having the pin type interface for establishing an electrical connection. This limitation requiring only specific pairing of the electrical interface of the generator and the exciter is a disadvantage.

SUMMARY OF THE INVENTION

It is therefore an object of the present invention to provide a technique for electrically connecting a generator and an exciter which obviates the limitation, as mentioned above, that requires only specific pairing of the electrical interface of the generator and the exciter.

The object is achieved by providing a connection device according to the invention and a turbogenerator according to the invention.

According to an aspect of the present technique, a connection device for electrically connecting a generator and an exciter is presented. The connection device includes an elongate body, a first connector set and a pin type connector set. The elongate body includes a first end and a second end. The first end and the second end are located along an axis of the elongate body.

The first connector set is positioned at the first end of the elongate body. The first connector set includes at least a first strip element and a second strip element. Each of the strip elements is electrically conducting and includes a first segment and a second segment. The first segment is aligned along the axis and is at least partially embedded in the elongate body. The second segment is arranged at an angle to the first segment and is extending along a surface of the elongate body at the first end. The first segment and the second segment are electrically connected. The second segment may extend radially along the surface of the elongate body at the first end.

The pin type connector set is positioned at the second end of the elongate body. The pin type connector set includes at least a first element and a second element. Each of the first element and the second element is electrically conducting.

The first strip element of the first connector set is electrically connected to the first element of the pin type connector set. The second strip element of the first connector set is electrically connected to the second element of the pin type connector set. Thus an electrical connection may be established through the connection device between the generator and the exciter that have dissimilar and incompatible electrical interfaces.

In one embodiment of the connection device, the first segment of the first strip element is electrically connected to the first element of the pin type connector set, and the first segment of the second strip element is electrically connected to the second element of the pin type connector set. This provides a simple way of connecting the first connector set to the pin type connector set.

In another embodiment of the connection device, the first strip element of the first connector set is electrically insulated from the second strip element of the first connector set, and the first element of the pin type connector set is electrically insulated from the second element of the pin type connector set. This insulation provides increased electrical safety for the connection device.

In another embodiment of the connection device, the first element of the pin type connector set is a first receptacle, and the second element of the pin type connector set is a second receptacle. Each of the receptacles is electrically conducting and at least partially embedded in the elongate body aligned along the axis. Each of the receptacles includes a receptacle opening on a surface of the elongate body at the second end. This provides a variant of the connection device adapted to be electrically coupled by physically attaching with a male part of the pin type interface of the generator or the exciter.

In another embodiment of the connection device, the first element of the pin type connector set is a first pin, and the second element of the pin type connector set is a second pin. Each of the pins is electrically conducting and extends along the axis from the second end of the elongate body such that at least a part of each of the pins projects out from a surface of the elongate body at the second end. This provides another variant of the connection device adapted to be electrically coupled by physically attaching with a female part of the pin type interface of the generator or the exciter.

In another embodiment of the connection device, the second segment of the first strip element and the second segment of the second strip element extending along the surface of the elongate body at the first end are in opposite directions. The second segment of the first strip element and the second segment of the second strip element may extend radially along the surface of the elongate body at the first end in opposite directions. This provides a preferred embodiment for alignment of the second segments of the strip elements of the first connector set.

In another embodiment of the connection device, the elongate body is formed of an electrically non conducting material. This results in an increased electrical safety for the connection device.

In another embodiment of the connection device, the first connector set and the pin type connector set are electrically insulated from the elongate body. This results in a further increased electrical safety for the connection device.

In another embodiment of the connection device, each of the first end and the second end of the elongate body has a circular cross-section. This provides for easy, simple and stable attachment of the connection device with the generator and the exciter, since the shafts of the rotor of the generator and the exciter are cylindrical bodies, each typically having circular cross-sections.

In another embodiment, the connection device further includes fastening means adapted to be physically attached to a shaft of the generator and to a shaft of the exciter. Thus the connection device may be fixed with the generator and the exciter. This provides for stability of the connection device when fixed with the generator and the exciter and when the exciter and/or the generator shaft are rotated.

According to another aspect of the present technique, a turbogenerator is presented. The turbogenerator includes a generator, an exciter and a connection device. The generator has a shaft with a generator axial lead. The generator axial lead includes an electrical interface. Similarly, the exciter has a shaft with an exciter axial lead. The exciter axial lead includes an electrical interface. The electrical interface of the exciter is incompatible for physically attaching to the electrical interface of the generator for establishing an electrical connection between the electrical interface of exciter and the electrical interface of the generator. The connection device is in accordance to any of the above mentioned embodiments. The connection device electrically connects the electrical interface of the generator with the electrical interface of the exciter and is positioned in series between the electrical interface of the generator and the electrical interface of the exciter.

In an embodiment of the turbogenerator, the electrical interface of the generator is electrically coupled with the first connector set of the connection device by physically attaching the electrical interface of the generator with the first connector set of the connection device. Furthermore, the electrical interface of the exciter is electrically coupled with the pin type connector set of the connection device by physically attaching the electrical interface of the exciter with the pin type connector set of the connection device. This provides a variant of the turbogenerator having the connection device in a specific orientation.

In another embodiment of the turbogenerator, the electrical interface of the generator is electrically coupled with the pin type connector set of the connection device by physically attaching the electrical interface of the generator with the pin type connector set of the connection device. Furthermore, the electrical interface of the exciter is electrically coupled with the first connector set of the connection device by physically attaching the electrical interface of the exciter with the first connector set of the connection device. This provides another variant of the turbogenerator having the connection device in an alternate orientation.

The present technique is further described hereinafter with reference to illustrated embodiments shown in the accompanying drawings, in which:

DESCRIPTION OF EMBODIMENTS

Hereinafter, above-mentioned and other features of the present technique are described in details. Various embodiments are described with reference to the drawings, wherein like reference numerals are used to refer to like elements throughout. In the following description, for purpose of explanation, numerous specific details are set forth in order to provide a thorough understanding of one or more embodiments. It may be noted that the illustrated embodiments are intended to explain, and not to limit the invention. It may be evident that such embodiments may be practiced without these specific details.

Figure 1:
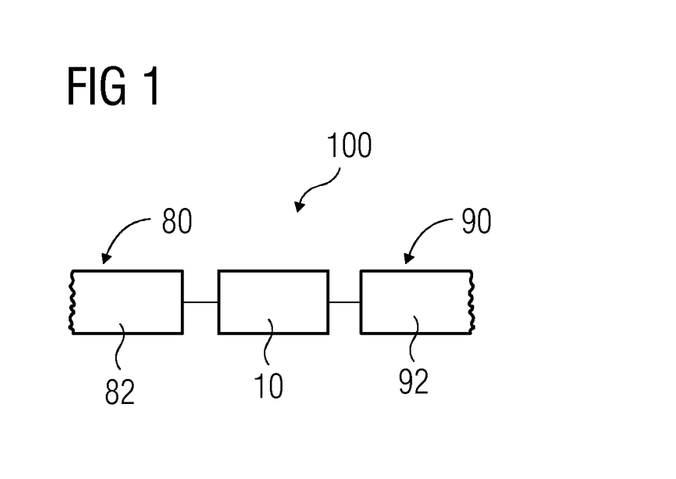
FIG. 1 is a schematic representation of a connection device for electrically connecting a generator and an exciter, in accordance with aspects of the present technique.

FIG. 1 is a schematic representation of a connection device 10 for electrically connecting a generator 80 and an exciter 90, in accordance with aspects of the present technique. To electrically connect the generator 80 to the exciter 90, the connection device 10 is positioned in series between a shaft 82 of the generator 80 and a shaft 92 of the exciter 90. The shaft 92 of the exciter 90 provides an electric current, typically a direct current, to the shaft 82 of the generator 80 through the connection device 10.

The current travels from the exciter 90 in a closed loop configuration along a conductive path (not shown) from the shaft 92 of the exciter 90 into the connection device 10 and further to rotor coils (not shown) of the shaft 82 of the generator 80, and then back through another conductive path (not shown) from the rotor coils of the shaft 82 of the generator 80 to the connection device 10 and into the shaft 92 of the exciter 90.

Figure 2:
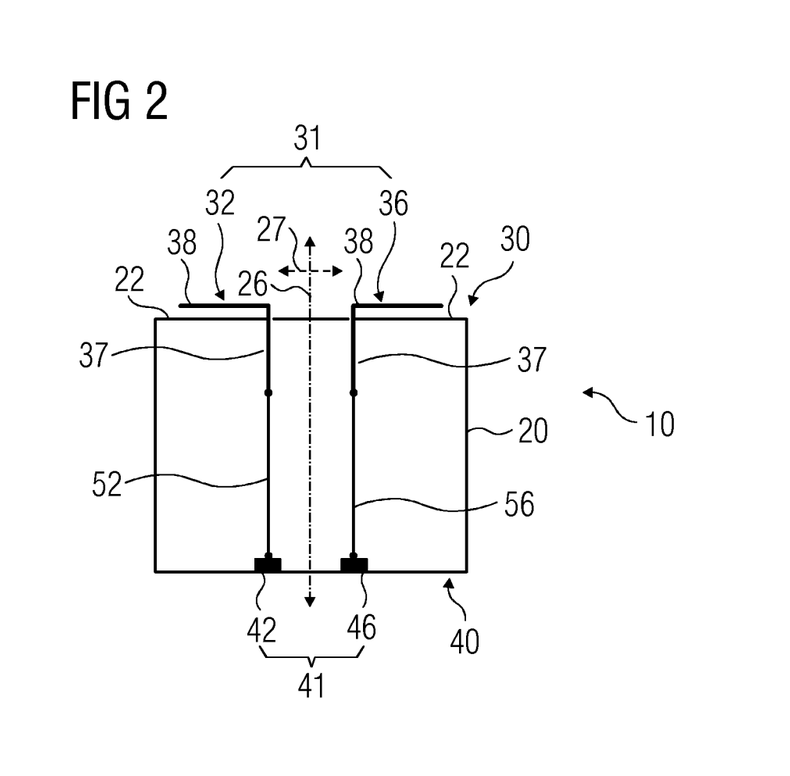
FIG. 2 is a schematic representation of an exemplary embodiment of the connection device.

FIG. 2 is a schematic representation of an exemplary embodiment of the connection device 10, in accordance with aspects of the present technique. The connection device 10 includes an elongate body 20, a first connector set 31 and a pin type connector set 41. The elongate body 20 includes a first end 30 and a second end 40. The first end 30 and the second end 40 are located along an axis 26 of the elongate body 20.

In one embodiment of the connection device 10, each of the first end 30 and the second end 40 of the elongate body 20 has a circular cross-section. The elongate body 20 may have, but not limited to, a cylindrical shape, more particularly a right circular cylinder, the axis 26 may be an axis of the right circular cylinder, and the first end 30 and the second end 40 may be two planes of the right circular cylinder perpendicular to the axis of the right circular cylinder. The elongate body 20 may have other suitable geometrical shapes such as a dumbbell shape, an hourglass shape, and so forth, which have a longitudinal axis and two planes that are substantially perpendicular to the longitudinal axis.

The elongate body 20 may be formed of an electrically non conducting material. Additionally or alternatively, the first connector set 31 and the pin type connector set 41 are electrically insulated from the elongate body 20. To achieve electrical insulation any known suitable technique may be used, and since such techniques are well known in the art of electrical sciences, the same has not been described herein for the sake of brevity.

The first connector set 31 is positioned at the first end 30 of the elongate body 20. The first connector set 31 includes at least a first strip element 32 and a second strip element 36. Each of the strip elements 32,36 is electrically conducting. The term 'electrically conducting' or 'conducting' as used herein in the present disclosure means capable of carrying electric current i.e. permitting the flow of electrical charges in one or more directions. To be electrically conducting, the strip elements 32,36 may be formed of a conductive material such as, but not limited to copper, aluminium, or any other conductive metal or alloy.

Each of the strip elements 32,36 includes a first segment 37 and a second segment 38. The first segment 37 is aligned along the axis 26 and is at least partially embedded in the elongate body 20. The first segment 37 may have a shape of a bar, a flattened band or a rod.

The second segment 38 is arranged at an angle to the first segment 37 and is extending radially along a surface 22 of the elongate body 20 at the first end 30. Optionally, the second segment 38 of the first strip element 32 and the second segment 38 of the second strip element 36 may extend from the corresponding first segments 37 in opposite directions.

The second segment 38 may have a flattened band like structure which is aligned parallel to or along the surface 22 of the elongate body 20 at the first end 30. In an exemplary embodiment, the axis 26 may be perpendicular to an axis 27 along which the second segment 38 extends. For example, when the elongate body 20 is cylindrical, the second segment 38 is arranged on one of the two circular planes of the cylinder that are perpendicular to the axis 26 of the cylinder, and is extending along a radius of the circular plane.

The first segment 37 and the second segment 38 are electrically connected. It may be noted that for the purposes of the present disclosure, the term 'electrically connected' used in reference to two or more entities means that an electric current or an electrical charge may flow back and forth between the entities. Thus, an electric current may flow back and forth between the first segment 37 and the second segment 38.

The angle between the first segment 37 and the second segment 38 may be between 45 degrees to 120 degrees. In a preferred embodiment, and as depicted in FIG. 2, the first segment 37 is perpendicular to the second segment 38. Furthermore, it is preferred that the strip elements 32,36 lie on either sides of the axis 26.

The pin type connector set 41 is positioned at the second end 40 of the elongate body 20. The pin type connector set 41 includes at least a first element 42 and a second element 46. Each of the first element 42 and the second element 46 is electrically conducting. Furthermore, it is preferred that the elements 42,46 are oriented parallel to one another, and lie on either sides of the axis 26.

The first strip element 32 of the first connector set 31 is electrically connected to the first element 42 of the pin type connector set 41. Similarly, the second strip element 36 of the first connector set 31 is electrically connected to the second element 46 of the pin type connector set 41. More particularly, in one embodiment of the connection device 10, the first segment 37 of the first strip element 32 is electrically connected to the first element 42 of the pin type connector set 41. Similarly, the first segment 37 of the second strip element 36 is electrically connected to the second element 46 of the pin type connector set 41. This may be achieved by having an electrical connection 52, such as a conducting wire, which physically and electrically connects the first strip element 32 to the first element 42, and independently physically and electrically connecting the second strip element 36 to the second element 46 by having an electrical connection 56.

It may be noted that, when the connection device 10 is connected to the generator 80 and the exciter 90, and electric current flows from the exciter 90 to the generator 80 and back to the exciter 90 via the connection device 10, then one of the strip elements 32,36 assumes a positive polarity and the other assumes a negative polarity. Similarly, one of the elements 42,46 assumes a positive polarity and the other assumes a negative polarity. However, due to the electrical connections between the connector sets 31,41 as described above, the polarity of the first strip element 32 is the same as the polarity of the first element 42, and similarly, the polarity of the second strip element 36 is the same as the polarity of the second element 46.

Furthermore, in the connection device 10, the first strip element 32 is electrically insulated from the second strip element 36. Similarly, the first element 42 of the pin type connector set 41 is electrically insulated from the second element 46 of the pin type connector set 41.

Now referring to FIG. 2 in combination with FIG. 1, the first connector set 31 of the connection device 10 may be attached to an electrical interface (not shown) of the shaft 82 of the generator 80, and the pin type connector set 41 may be attached to an electrical interface (not shown) of the shaft 92 of the exciter 90. Alternatively, the first connector set 31 of the connection device 10 may be attached to the electrical interface (not shown) of the shaft 92 of the exciter 90, and the pin type connector set 41 may be attached to the electrical interface (not shown) of the shaft 82 of the generator 80. Thus, by using the connection device 10, the generator 80 may be electrically connected to the exciter 90, although the generator 80 and the exciter 90 have dissimilar and incompatible electrical interfaces.

Figure 3:
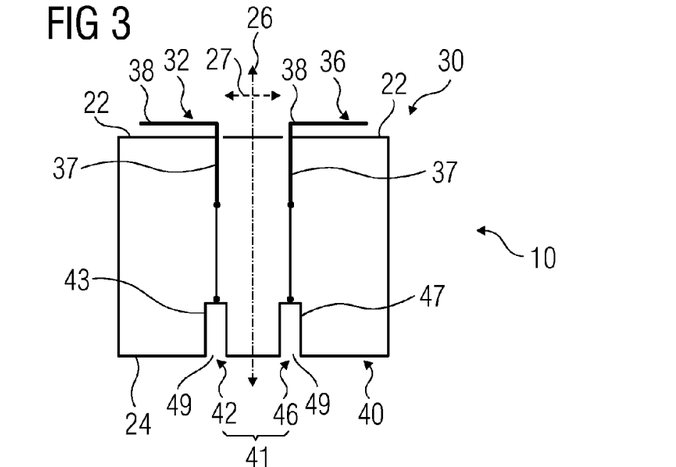
FIG. 3 is a schematic representation of another exemplary embodiment of the connection device with receptacles.

FIG. 3 is a schematic representation of another exemplary embodiment of the connection device 10. In this embodiment, the first element 42 of the pin type connector set 41 is a first receptacle 43, and the second element 46 of the pin type connector set 41 is a second receptacle 47. Each of the receptacles 43,47 is electrically conducting and at least partially embedded in the elongate body 20 aligned along the axis 26. Each of the receptacles 43,47 includes a receptacle opening 49 on a surface 24 of the elongate body 20 at the second end 40. The first receptacle 43 is electrically connected to the first strip element 32, and more particularly to the first segment 37 of the first strip element 32. Similarly, the second receptacle 47 is electrically connected to the second strip element 36, and more particularly to the first segment 37 of the second strip element 36.

The receptacles 43,47 are basically holes or cavities that may be cylindrical, cuboidal, etc, in shape. When the connection device 10 is fitted to the generator (not shown in FIG. 3) or the exciter (not shown in FIG. 3), the receptacles 43,47 receive a male part (not shown) of the generator or the exciter, respectively, acting as an electrical interface of the generator or the exciter such that the male part is appropriately accommodated in the receptacles 43,47.

Figure 4:
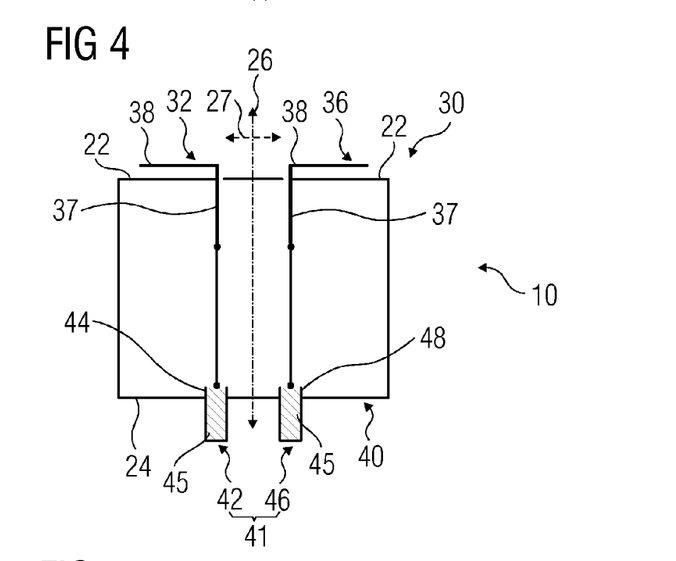
FIG. 4 is a schematic representation of another exemplary embodiment of the connection device with pins.

FIG. 4 is a schematic representation of another exemplary embodiment of the connection device 10. In this embodiment of the connection device 10, the first element 42 of the pin type connector set 41 is a first pin 44, and the second element 46 of the pin type connector set 41 is a second pin 48. Each of the pins 44,48 is electrically conducting and extends along the axis 26 from the second end 40 of the elongate body 20 such that at least a part 45 of each of the pins 44,48 projects out from a surface 24 of the elongate body 20 at the second end 40.

The first pin 44 is electrically connected to the first strip element 32, and more particularly to the first segment 37 of the first strip element 32. Similarly, the second pin 48 is electrically connected to the second strip element 36, and more particularly to the first segment 37 of the second strip element 36.

The pins 44,48 may be solid or hollow bodies made of electrically conducting material and may be cylindrical, cuboidal, etc, in shape. When the connection device 10 is fitted to the generator (not shown in FIG. 4) or the exciter (not shown in FIG. 4), the part 45 of each of the pins 44,48 is inserted in a female part (not shown) of the generator or the exciter acting as an electrical interface of the generator or the exciter to establish an electrical connection between the pins 44,48 of the connection device 10 and the female part of the generator or the exciter.

Figure 5:
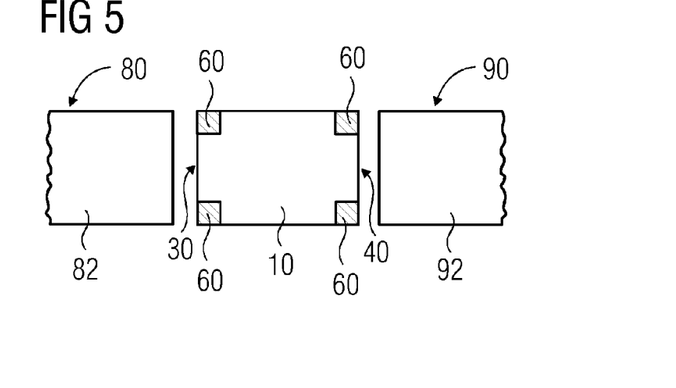
FIG. 5 is a schematic representation of another exemplary embodiment of the connection device with fastening means.

FIG. 5 is a schematic representation of another exemplary embodiment of the connection device 10 which further includes fastening means 60. The fastening means 60 is adapted to be physically attached to the shaft 82 of the generator 80 and to the shaft 92 of the exciter 90. Thus the connection device 10 may be fixed with the generator 80 and the exciter 90. The fastening means 60 may comprise a screw, a bolt, a clamp, or a flange and screw, and so forth. The fastening means 60 of the connection device 10 are designed such that they can be fastened to corresponding means at the shafts 82,92.

Figure 6:
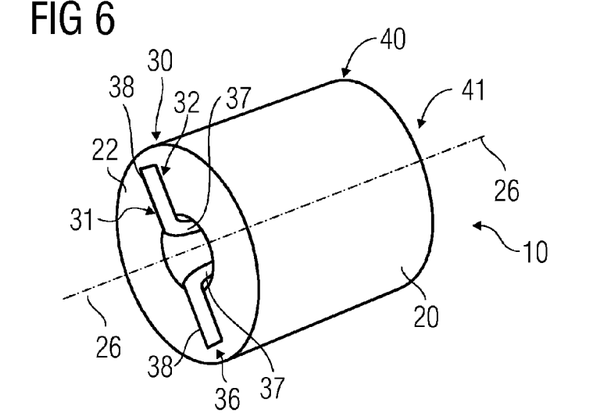
FIG. 6 is a perspective view of a schematic representation of an exemplary embodiment of the connection device.
Figure 7:
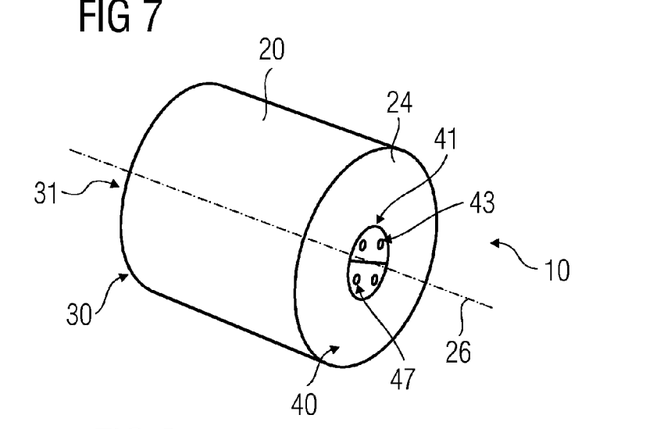
FIG. 7 is another perspective view of a schematic representation of the exemplary embodiment of the connection device of FIG. 6.

Now referring to FIG. 6 along with FIG. 7, the depictions of FIG. 6 and FIG. 7 together present an exemplary embodiment of the connection device 10 showing perspective views of this exemplary embodiment, as viewed from different ends of the connection device 10. FIG. 6 depicts a view of the first end 30 and FIG. 7 depicts a view of the second end 40 of the connection device 10. In this embodiment of the connection device 10, the elongate body 20 is a right circular cylinder, and includes the first strip element 32 and the second strip element 36 extending radially outwards in opposite directions at the first end 30. At the second end 40 is the pin type connector set 41 including the first receptacle 43 and the second receptacle 47. As depicted in FIG. 7, the connection device 10 may optionally include more than one such receptacles 43,47.

Figure 8:
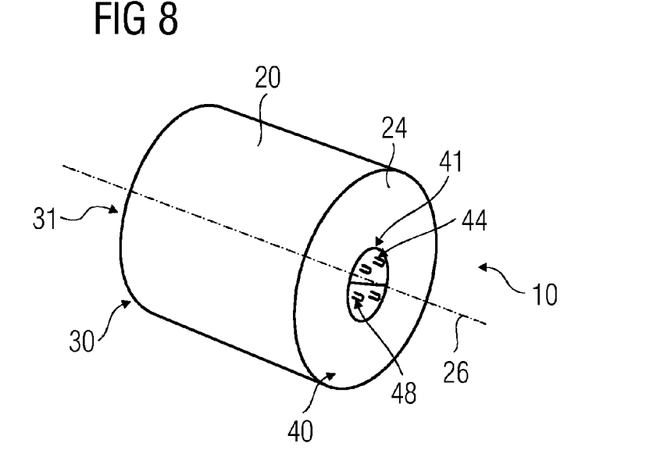
FIG. 8 is a perspective view of a schematic representation of an alternative of the exemplary embodiment of the connection device of FIG. 7.

Now referring to FIG. 6 along with FIG. 8, the depictions of FIG. 6 and FIG. 8 together present another exemplary embodiment of the connection device 10 showing perspective views of this exemplary embodiment, as viewed from different ends of the connection device 10. FIG. 6 depicts a view of the first end 30 and FIG. 8 depicts a view of the second end 40 of the connection device 10. In this embodiment of the connection device 10, the elongate body 20 is a right circular cylinder, and includes the first strip element 32 and the second strip element 36 extending radially outwards in opposite directions at the first end 30. At the second end 40 is the pin type connector set 41 including the first pin 44 and the second pin 48. As depicted in FIG. 8, the connection device 10 may optionally include more than one such pins 44,48.

Figure 9:
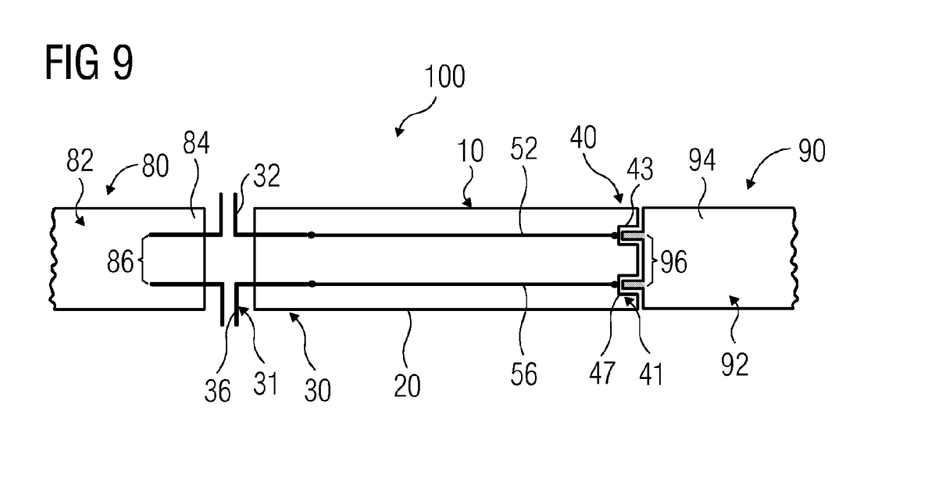
FIG. 9 is a schematic representation of an orientation of an exemplary embodiment of a turbogenerator.
Figure 10:
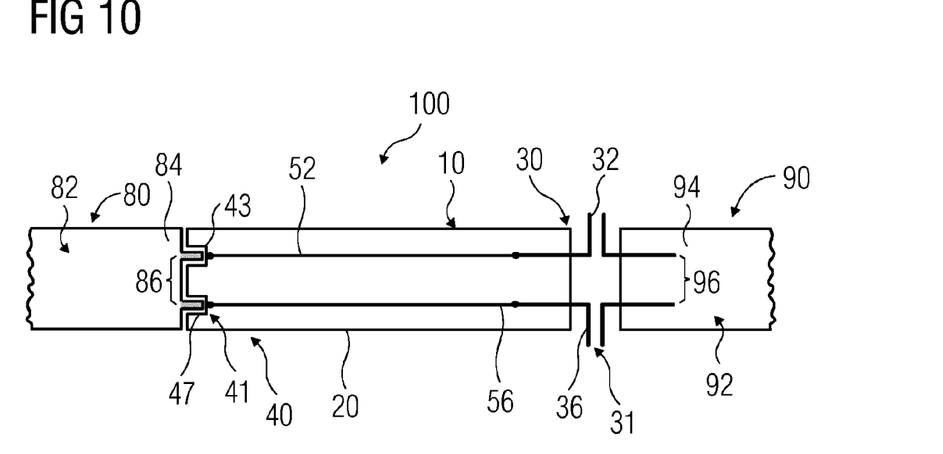
FIG. 10 is a schematic representation of another orientation of an exemplary embodiment of the turbogenerator, in accordance with aspects of the present technique.

According to another aspect of the present technique, a turbogenerator 100 as depicted in FIG. 1, exemplary embodiments of which are also depicted in FIGS. 9 and 10, is presented. The turbogenerator 100 includes a generator 80, an exciter 90 and a connection device 10. The structural components and the principle of operation of generators and exciters in general are well known in the art of turbogenerator machines such as a rotating field based alternating current electric generator (AC electric generator), and thus the same has not been described herein for the sake of brevity.

The connection device 10 is in accordance to any of the above mentioned embodiments as described with reference to FIGS. 1 to 8. The alignment of the connection device 10, the generator 80 and the exciter 90 is as described with reference to FIG. 1. The connection device 10 electrically connects the generator 80 with the exciter 90 and is positioned in series between the generator 80 and the exciter 90. The flow of electric current between the exciter 90, the connection device 10, and the generator 80 is same as has been described with reference to FIG. 1.

Now referring to FIG. 9 and FIG. 10, FIG. 9 is a schematic representation of an orientation of an exemplary embodiment of the turbogenerator 100, whereas FIG. 10 is a schematic representation of another orientation of an exemplary embodiment of the turbogenerator 100, in accordance with aspects of the present technique.

The generator 80 has the shaft 82 with a generator axial lead 84. The generator axial lead 84 includes an electrical interface 86. Similarly, the exciter 90 has the shaft 92 with an exciter axial lead 94. The exciter axial lead 94 includes an electrical interface 96. The electrical interface 96 of the exciter 90 is incompatible for physically attaching to the electrical interface 86 of the generator 80 for establishing an electrical connection between the electrical interface 96 of exciter 90 and the electrical interface 86 of the generator 80. In the embodiments of the turbogenerator 100, as depicted in FIGS. 9 and 10, the connection device 10 is same as described with reference to FIGS. 2,3,5,6 and 7.

Now referring only to FIG. 9, the first end 30 of the connection device 10 is aligned with the generator 80 and the second end 40 of the connection device 10 is aligned with the exciter 90. The first connector set 31 of the connection device 10 physically attaches and thereby electrically connects to the electrical interface 86 of the generator 80. The pin type connector set 41 of the connection device 10 physically attaches and thereby electrically connects to the electrical interface 96 of the exciter 90. Thus, an electrical connection is formed between the electrical interface 86 of the generator 80 and the electrical interface 96 of the exciter 90 via the connection device 10 positioned in series between the generator 80 and the exciter 90.

Thus, an electric current flows from the electrical interface 96 of the exciter 90 into the connection device 10 through one of the receptacles 43 or 47 of the pin type connector set 41, say the first receptacle 43, and subsequently into the generator 80 via the electrical interface 86 of the generator 80 through the first strip element 32 of the connection device 10, and back from the generator 80 through the electrical interface 86 of the generator 80 into the connection device 10 via the second strip element 36 and subsequently into the exciter 90 via the electrical interface 96 of the exciter 90 through the second receptacle 46 of the pin type connector set 41.

Now referring only to FIG. 10, the first end 30 of the connection device 10 is aligned with the exciter 90 and the second end 40 of the connection device 10 is aligned with the generator 80. The first connector set 31 of the connection device 10 physically attaches and thereby electrically connects to the electrical interface 96 of the exciter 90. The pin type connector set 41 of the connection device 10 physically attaches and thereby electrically connects to the electrical interface 86 of the generator 80. Thus, an electrical connection is formed between the electrical interface 86 of the generator 80 and the electrical interface 96 of the exciter 90 via the connection device 10 positioned in series between the generator 80 and the exciter 90.

Thus, an electric current flows from the electrical interface 96 of the exciter 90 into the connection device 10 through one of the strip elements 32 or 36 of the first connector set 31, say the first strip element 32, and subsequently into the generator 80 via the electrical interface 86 of the generator 80 through the first receptacle 43 of the connection device 10, and back from the generator 80 through the electrical interface 86 of the generator 80 into the connection device 10 via the second receptacle 47 and subsequently into the exciter 90 via the electrical interface 96 of the exciter 90 through the second strip element 36 of the connection device 10.

It may be noted that, although in the illustrated embodiments of the turbogenerator 100, as depicted in FIGS. 9 and 10, the connection device 10 includes features same as described with reference to FIGS. 2,3,5,6 and 7, other embodiments of the turbogenerator 100 may include the connection device 10 with features same as described with reference to FIGS. 2,4,5,6 and 8.

While the present technique has been described in detail with reference to certain embodiments, it should be appreciated that the present technique is not limited to those precise embodiments. Rather, in view of the present disclosure which describes exemplary modes for practicing the invention, many modifications and variations would present themselves, to those skilled in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

The invention claimed is:

1. A connection device for electrically connecting a generator and an exciter, the connection device comprising:
a body comprising a first end and a second end spaced apart along an axis of the body, the body having a first surface at the first end thereof;
a first connector set positioned at the first end of the body, the first connector set comprising at least a first strip element and a second strip element, wherein each of the strip elements is electrically conducting and comprises a first segment extending toward the second end of the body and being at least partially embedded in the body, and a second segment arranged at an angle to the first segment and extending over the first surface of the body at the first end, wherein the first segment and the second segment of each strip element are electrically connected;
a pin type connector set positioned at the second end of the body, wherein the pin type connector set comprises at least a first element and a second element, wherein each of the first element and the second element is electrically conducting; and
wherein the first strip element of the first connector set is electrically connected to the first element of the pin type connector set and the second strip element of the first connector set is electrically connected to the second element of the pin type connector set.

2. The connection device according to claim 1, wherein the first segment of the first strip element is electrically connected to the first element of the pin type connector set, and the first segment of the second strip element is electrically connected to the second element of the pin type connector set.

3. The connection device according to claim 2, wherein the first strip element of the first connector set is electrically insulated from the second strip element the first connector set, and the first element of the pin type connector set is electrically insulated from the second element of the pin type connector set.

4. The connection device of claim 1, wherein the first segment of each strip element is aligned along the axis of the body and is at least partially embedded in the body, and each second segment is arranged at an angle to the respective first segment and extends over the first surface of the body at the first end, wherein the first segment and the second segment of each strip element are electrically connected; and a pin type connector set positioned at the second end of the body wherein the pin type connector set comprises at least a first element and a second element, wherein each of the first element and the second element is electrically conducting;

wherein the first strip element of the first connector set is electrically connected to the first element of the pin type connector set and the second strip element of the first connector set is electrically connected to the second element of the pin type connector set.

5. The connection device of claim 1, wherein the second segment of each strip element extends along the first surface of the body.

6. The connection device of claim 1, wherein the body is elongate along the axis thereof.

7. The connection device according to claim 1, further comprising:

a second surface at the second end of the body;

wherein the first element of the pin type connector set is a first receptacle and the second element of the pin type connector set is a second receptacle, wherein each of the first and second receptacles is electrically conducting and is at least partially embedded in the body, and each of the receptacles comprises a receptacle opening on the second surface of the body at the second end thereof.

8. The connection device of claim 7, wherein each of the first and second receptacles is aligned along the axis of the body.

9. The connection device according to claim 1, further comprising:

the first element of the pin type connector set is a first pin and the second element of the pin type connector set is a second pin, wherein each of the first and second pins is electrically conducting and extends generally along the axis of the body from the second end of the elongate body such that at least a part of each of the pins projects out from the second surface of the body at the second end.

10. The connection device according to claim 1, wherein the second segment of the first strip element and the second segment of the second strip element extend along the first surface of the body at the first end in generally opposite directions.

11. The connection device according to claim 1, wherein the body is comprised of an electrically non conducting material.

12. The connection device according to claim 1, wherein the first connector set and the pin type connector set are electrically insulated from the body.

13. The connection device according to claim 1, wherein each of the first end and the second end of the body is circular.

14. The connection device according to claim 1, comprising a fastener configured to be physically attached to a shaft of the generator and to a shaft of the exciter and operable to fix the connection device at the generator and the exciter.

15. A turbogenerator comprising:

an electrical generator comprising a shaft with a generator electrical axial lead, the generator axial lead having a generator electrical interface;

an electrical exciter comprising a shaft with an exciter axial electrical lead, the exciter axial lead having an exciter electrical interface;

wherein the exciter electrical interface is of a respective type incompatible for physically attaching to the generator electrical interface for establishing an electrical connection with the generator electrical interface; and a connection device according to claim 1, wherein the connection device electrically connects the generator electrical interface with the exciter electrical interface and is positioned in electrical series between the generator electrical interface and the exciter electrical interface.

16. The turbogenerator according to claim 15, wherein the generator electrical interface is electrically coupled with the first connector set of the connection device by physically attaching the generator electrical interface with the first connector set of the connection device, and wherein the exciter electrical interface is electrically coupled with the pin type connector set of the connection device by physically attaching the exciter electrical interface with the pin type connector set of the connection device.

17. The turbogenerator according to claim 15, wherein the generator electrical interface is electrically coupled with the pin type connector set of the connection device by physically attaching the generator electrical interface with the pin type connector set of the connection device, and wherein the exciter electrical interface is electrically coupled with the first connector set of the connection device by physically attaching the exciter electrical interface with the first connector set of the connection device.

* * * * *